(12) United States Patent
Kim et al.

(10) Patent No.: US 11,978,448 B2
(45) Date of Patent: May 7, 2024

(54) DISPLAY DEVICE AND METHOD OF OPERATING THE SAME

(71) Applicant: LG ELECTRONICS INC., Seoul (KR)

(72) Inventors: Jeongmin Kim, Seoul (KR); Youngtae Chung, Seoul (KR); Kwangrim Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 341 days.

(21) Appl. No.: 17/428,798

(22) PCT Filed: Feb. 19, 2020

(86) PCT No.: PCT/KR2020/002399
§ 371 (c)(1),
(2) Date: Aug. 5, 2021

(87) PCT Pub. No.: WO2020/175845
PCT Pub. Date: Sep. 3, 2020

(65) Prior Publication Data
US 2022/0005473 A1 Jan. 6, 2022

(30) Foreign Application Priority Data

Feb. 26, 2019 (KR) .................. 10-2019-0022179

(51) Int. Cl.
*G10L 15/22* (2006.01)
*G06F 16/903* (2019.01)
*G06F 16/906* (2019.01)
*H04N 21/4722* (2011.01)

(52) U.S. Cl.
CPC ........ *G10L 15/22* (2013.01); *G06F 16/90344* (2019.01); *G06F 16/906* (2019.01); *H04N 21/4722* (2013.01); *G10L 2015/223* (2013.01)

(58) Field of Classification Search
CPC ..... G06F 3/167; G06F 3/04842; G10L 15/26; G10L 2015/223
See application file for complete search history.

(56) References Cited

U.S. PATENT DOCUMENTS

| 10,423,709 | B1* | 9/2019 | Bradley | G06F 40/103 |
| 11,620,102 | B1* | 4/2023 | Karppanen | G06F 40/134 |
| | | | | 715/728 |
| 2007/0006078 | A1* | 1/2007 | Jewsbury | G06F 16/986 |
| | | | | 715/234 |
| 2007/0006079 | A1* | 1/2007 | Jewsbury | G06F 40/143 |
| | | | | 715/255 |
| 2008/0094368 | A1 | 4/2008 | Ording et al. | |

(Continued)

FOREIGN PATENT DOCUMENTS

| KR | 10-2013-0102839 A | 9/2013 |
| KR | 10-2016-0014926 A | 2/2016 |

(Continued)

*Primary Examiner* — Mark Villena
(74) *Attorney, Agent, or Firm* — Birch, Stewart, Kolasch & Birch, LLP

(57) ABSTRACT

Disclosed is a display device capable of classifying clickable content in a web application screen, and the display device can perform primary classification on all nodes existing in a document object model (DOM) and perform secondary classification for determining whether a node exists in the screen.

14 Claims, 18 Drawing Sheets

(56) References Cited

U.S. PATENT DOCUMENTS

| | | | | |
|---|---|---|---|---|
| 2014/0278440 A1* | 9/2014 | Chung | ............... | G10L 15/26 |
| | | | | 704/275 |
| 2014/0350928 A1* | 11/2014 | Zeigler | ............... | G10L 15/26 |
| | | | | 704/235 |
| 2020/0065361 A1* | 2/2020 | Lewbel | ............... | G06F 3/0485 |

FOREIGN PATENT DOCUMENTS

| | | | |
|---|---|---|---|
| KR | 10-2016-0083058 A | 7/2016 | |
| KR | 10-2017-0129165 A | 11/2017 | |

* cited by examiner

FIG. 7

FIG. 12
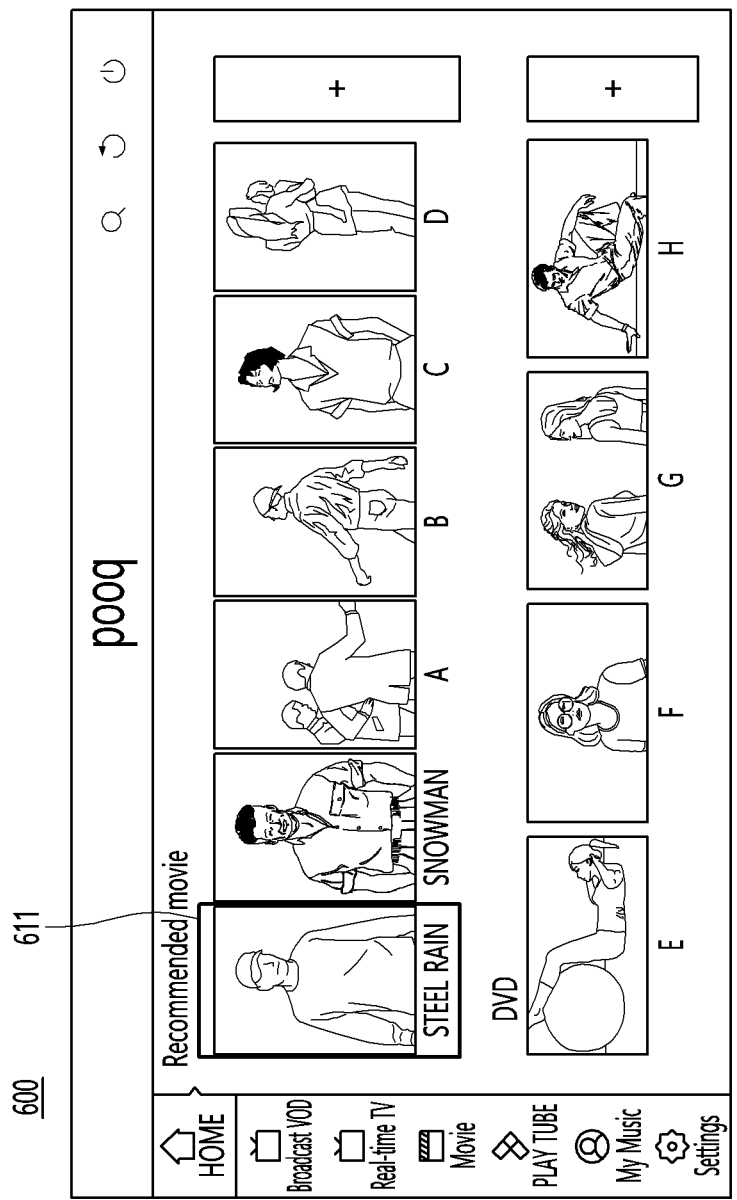

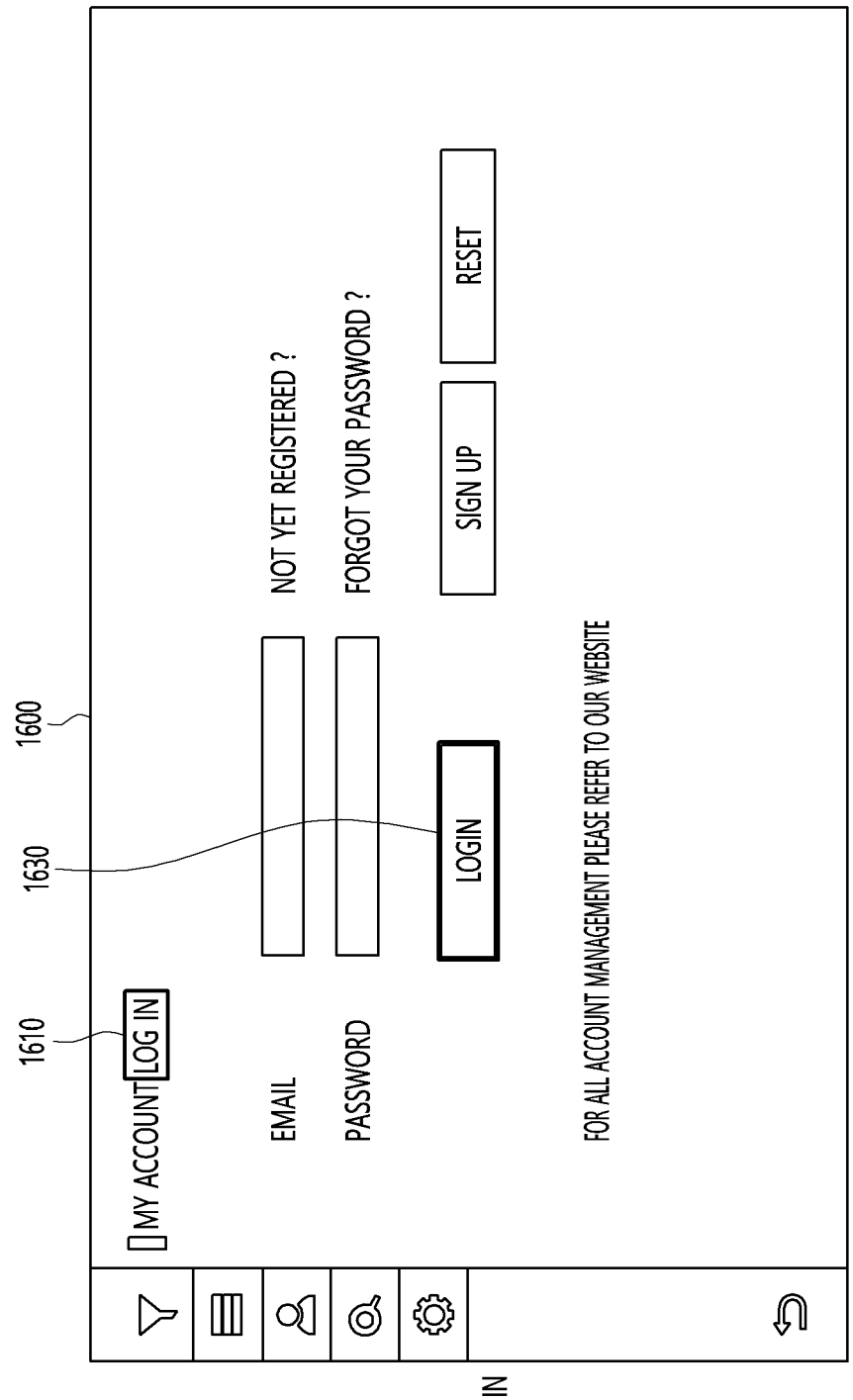
FIG. 16
LOG IN

DISPLAY DEVICE AND METHOD OF OPERATING THE SAME

CROSS REFERENCE TO RELATED APPLICATIONS

This application is the National Phase of PCT International Application No. PCT/KR2020/002399, filed on Feb. 19, 2020, which claims priority under 35 U.S.C. 119(a) to Patent Application No, 10-2019-0022179, filed in the Republic of Korea on Feb. 26, 2019, all of which are hereby expressly incorporated by reference into the present application.

TECHNICAL FIELD

The present disclosure relates to a display device and, more particularly, to a display device for classifying web voice matching candidates.

BACKGROUND ART

Digital TV services using wired or wireless communication networks are becoming common. Digital TV service can provide a variety of services that could not be provided in the conventional analog broadcasting service.

For example, IPTV (Internet Protocol Television), which is a type of digital TV service, and smart TV service provide bidirectionality that allows a user to actively select a type of viewing program and a viewing time. IPTV, smart TV service may provide a variety of additional services, such as Internet search, home shopping, and online games based on this bidirectionality.

In addition, a recent TV provides various voice recognition services such as recognizing user's voice and searching for content in response thereto.

However, in the related art, when there is a variety of content on a web screen, there is an inconvenience in that a user has to directly select (or click) desired content through a remote control device.

INVENTION

Technical Problem

The present disclosure relates to a display device capable of classifying clickable content on a web application screen.

The present disclosure relates to a display device capable of extracting text corresponding to clickable content when overlapping text is included in a web application screen.

Technical Solution

A display device according to an embodiment of the present disclosure may perform primary classification with respect to all nodes present on a document object model (DOM) and perform secondary classification to determine whether it is a node present on the screen.

A display device according to another embodiment of the present disclosure may start monitoring of DOM change, sequentially click overlapping text according to priority, check DOM change during a specific time, click overlapping text of next priority when there is no change, and end monitoring of DOM change when DOM change occurs.

Effect of the Invention

According to embodiments of the present disclosure, since content can be clicked on a web application screen by only voice uttered by a user, user's direct selection of content is unnecessary. Therefore, it is possible to greatly improve user convenience in content selection.

According to embodiments of the present disclosure, even if there is overlapping text on a web application content, since only clickable content is selected by only voice uttered by a user, it is possible to accurately apply user's click intention.

DESCRIPTION OF DRAWINGS

FIG. 7 is a view illustrating an example of an HTML document obtained through a document object model.

FIGS. 12 and 13 are views illustrating a user scenario according to an embodiment of the present disclosure.

FIG. 16 is a view illustrating another user scenario in which, when overlapping texts are included in an execution screen of a web application, they are handled.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
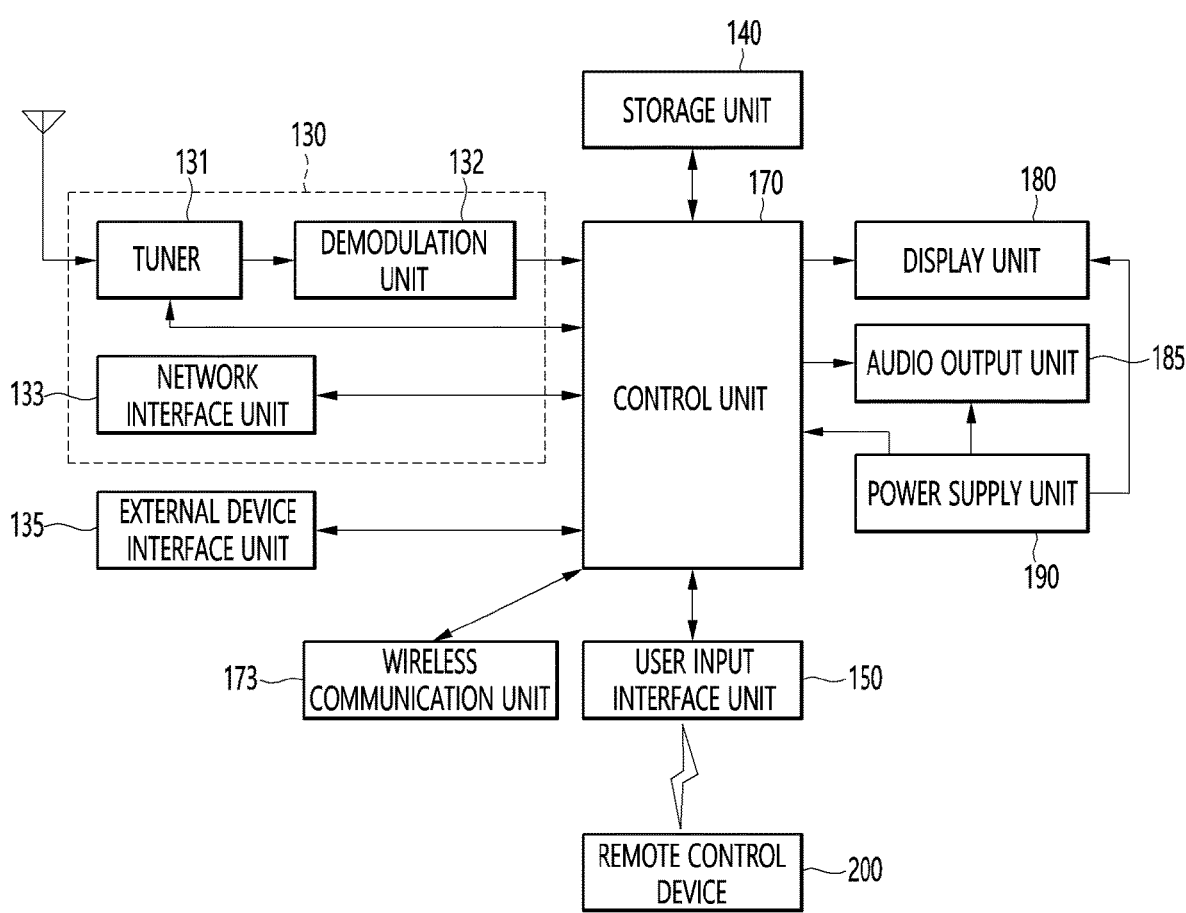
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A voice signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. In other words, the network interface unit 133 can transmit or receive data to or from a corresponding server by accessing a predetermined webpage through the network.

Then, the network interface unit 133 can receive contents or data provided from a content provider or a network operator. In other words, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not illustrated) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

The wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
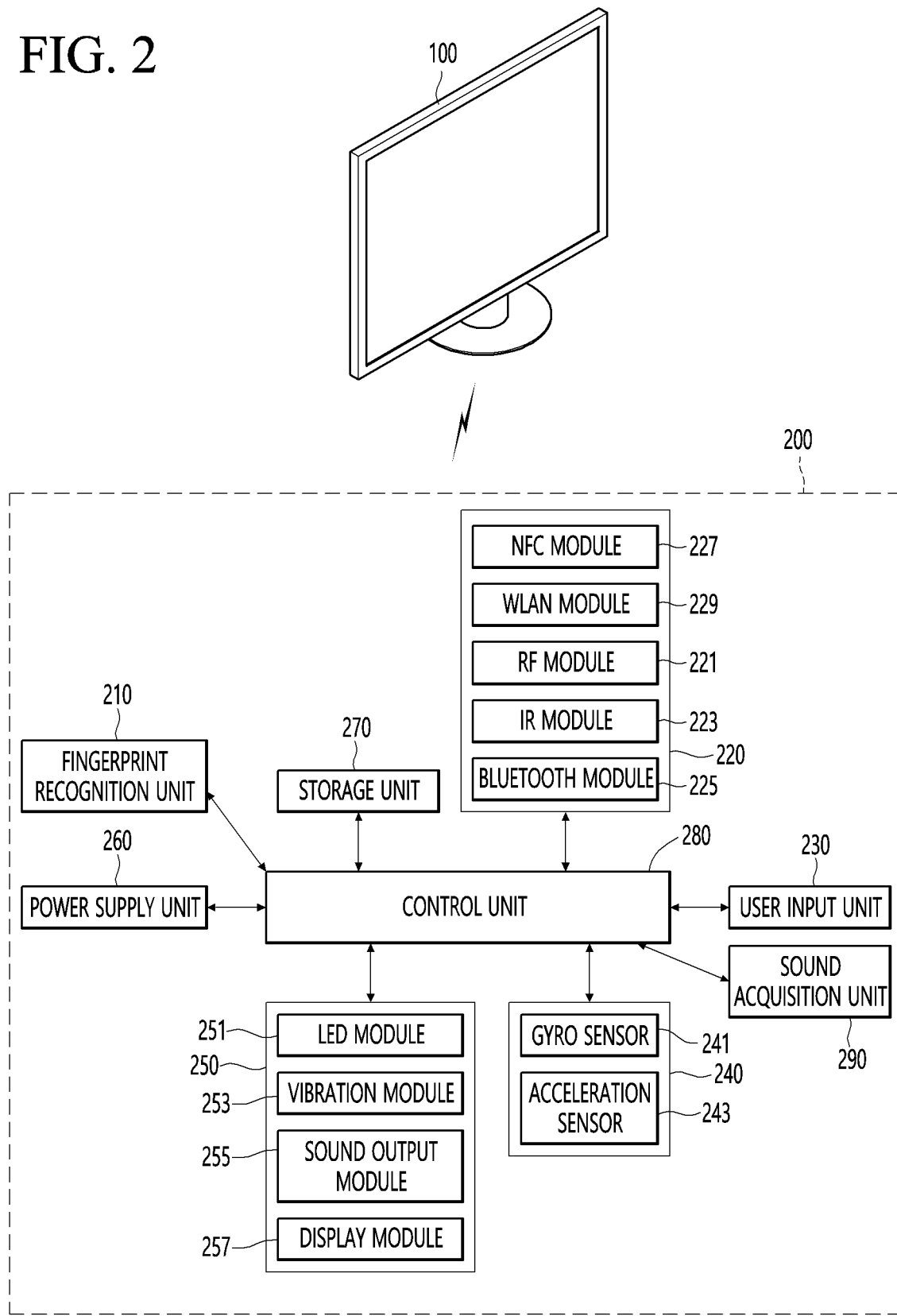
FIG. 2 is a block diagram illustrating a remote control device according to an embodiment of the present disclosure.
Figure 3:
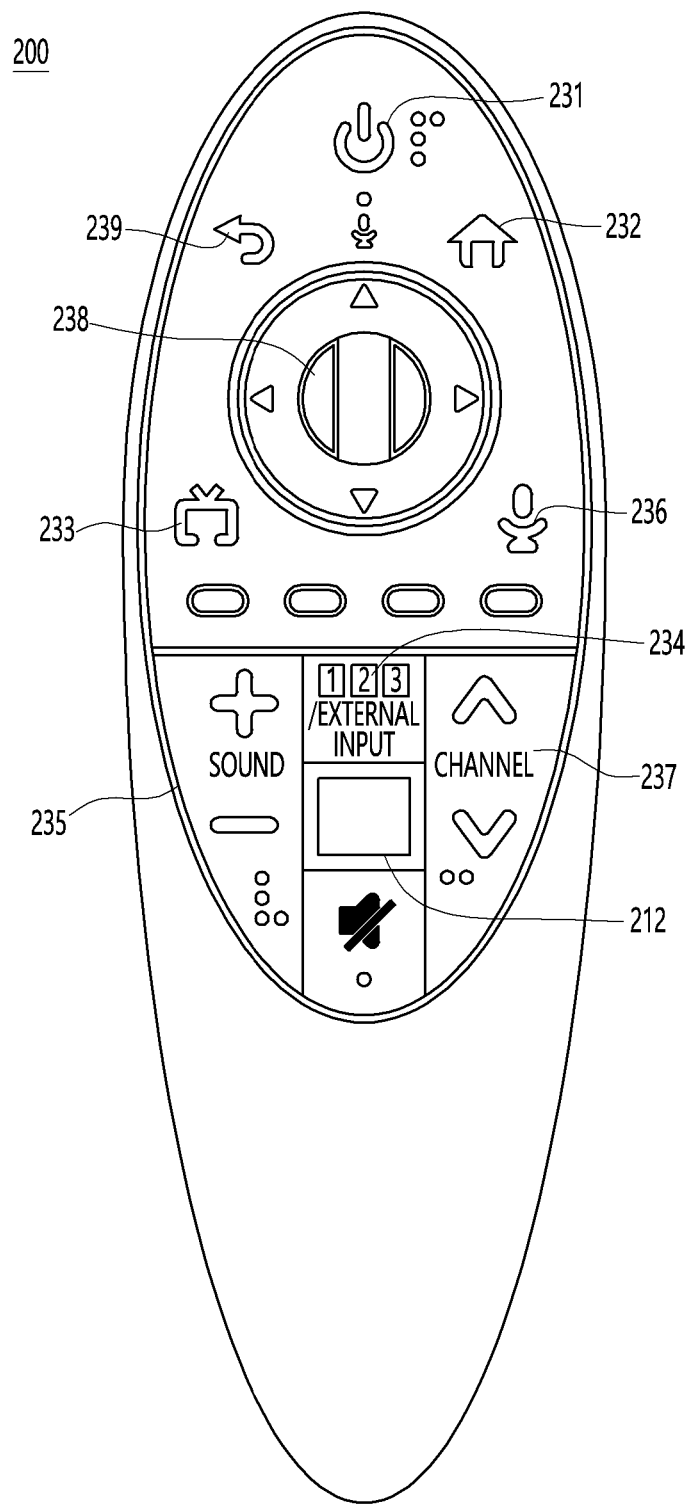
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
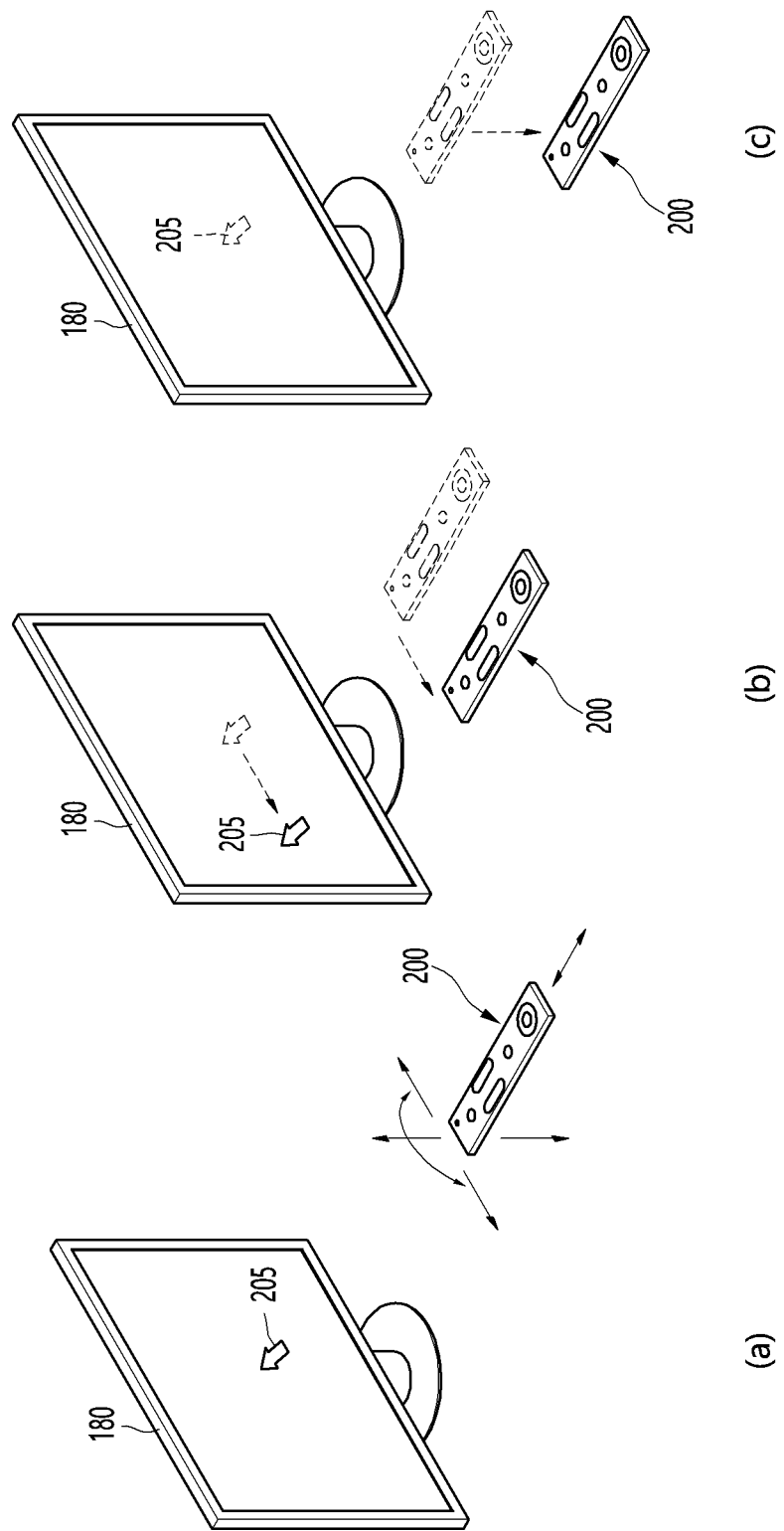
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180.

Thus, a selection area in the display unit 180 corresponding to the pointer 205 can be zoomed in and displayed larger.

On the contrary, if the user moves the remote control device 200 to approach the display unit 180, the selection area in the display unit 180 corresponding to the pointer 205 may be zoomed out and reduced.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. In other words, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
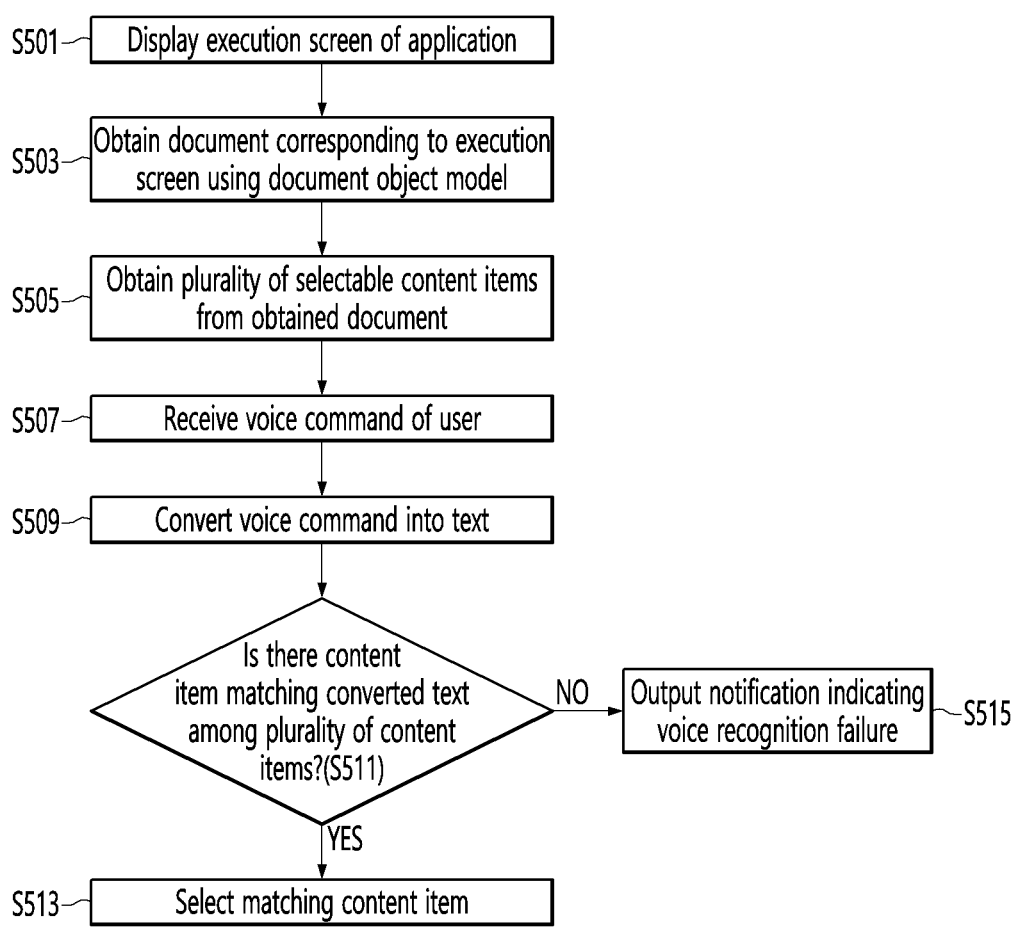
FIG. 5 is a flowchart illustrating a method of operating a display device according to an embodiment of the present disclosure.

FIG. 5 is a flowchart illustrating a method of operating a display device according to an embodiment of the present disclosure.

In particular, FIG. 5 relates to a method of classifying items selectable or clickable by a user among displayed items on a screen.

Hereinafter, the control unit 170 may be composed of one or more processors.

Referring to FIG. 5, the control unit 170 of the display device 100 displays an execution screen of an application on the display unit 180 (S501).

An application may represent a content provider. The content provider may provide media content such as movie, DVD or music through the application.

The application may be a web application for providing content through a web.

The execution screen of the application will be described with reference to FIG. 6.

Figure 6:
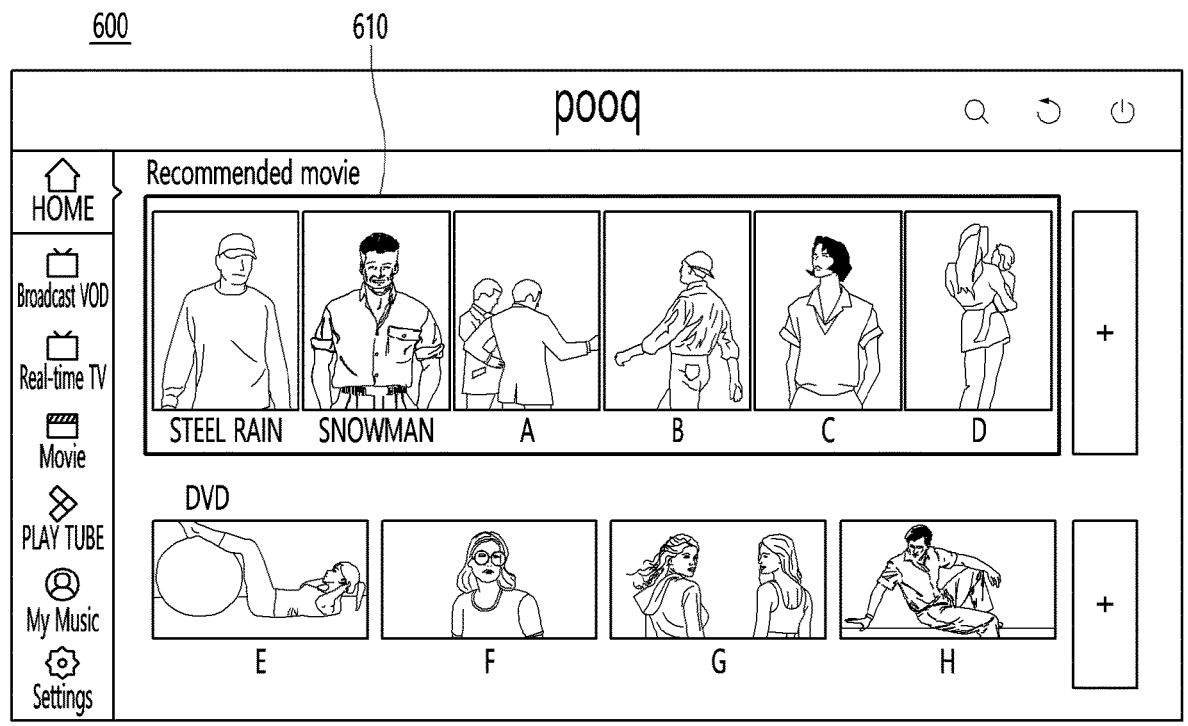
FIG. 6 is a view illustrating an example of an execution screen of a web application according to an embodiment of the present disclosure.

FIG. 6 is a view illustrating an example of an execution screen of a web application according to an embodiment of the present disclosure.

The execution screen 600 of the web application may include a content list 610 provided by a content provider.

The content list 610 may include a plurality of content items 611 to 616.

Each of the plurality of content items 611 to 616 may be an item selectable or clickable by a user.

The plurality of content items 611 to 616 may include one or more of a thumbnail image indicating content and a title of content.

FIG. 5 will be described again.

The control unit 170 obtains a document corresponding to the execution screen of the application using a document object model (DOM) (S503).

The document object model may be an interface for accessing an XML document or an HTML document.

The document object model may provide a method of defining all elements in a document and accessing each element.

The document corresponding to the execution screen of the application may be texts coded to express the execution screen of the application.

The document object model is a standard object model of W3C, and a document obtained through the document object model may be expressed in a hierarchical structure.

Meanwhile, the control unit 170 may obtain the document through the document object model in a state in which a voice recognition service is able to be provided through the display device 100.

For example, when the control unit 170 receives, from the remote control device 200, a command for requesting a voice recognition service, the document corresponding to the execution screen of the application may be obtained through the document object model.

As another example, the control unit 170 may obtain a document corresponding to the execution screen of the application through the document object model, when recognizing the wakeup word uttered by the user.

The control unit 170 may receive a document corresponding to the execution screen of the application from an application provider for providing an application.

Figure 7:
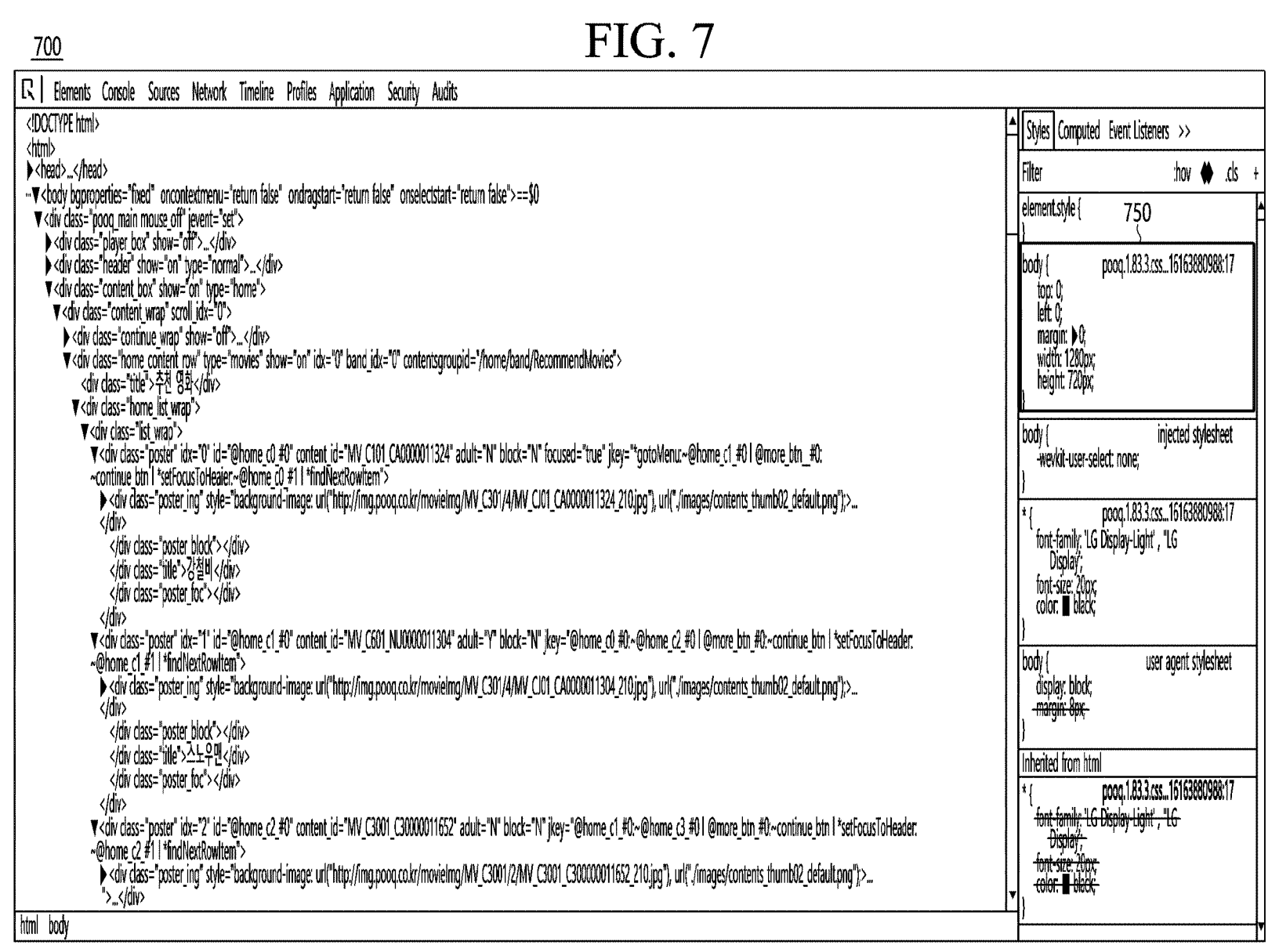

FIG. 7 is a view illustrating an example of an HTML document obtained through a document object model.

Referring to FIG. 7, the HTML document 700 may have a hierarchical structure. The HTML document 700 may include an html element (or a root element) as a higher element.

The html element may include a head element and a body element as middle elements.

Each of the head element and the body element may include a sub element.

The sub element of the head element may represent the title of a content item in the form of text.

The sub element of the body element may represent a link or paragraph of a content item in the form of text.

FIG. 5 will be described again.

The control unit 170 obtains a plurality of selectable content items using the document obtained through the document object model (S505).

The control unit 170 may extract a plurality of selectable or clickable content items, by analyzing the XML document or HTML document obtained through the document object model.

This will be described with reference to the following drawings.

Figure 8:
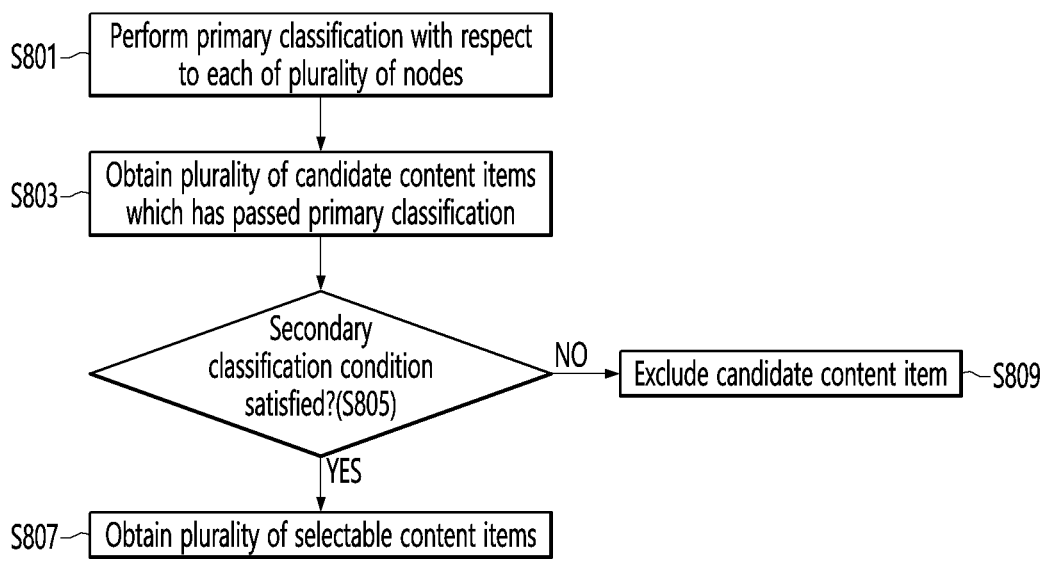
FIG. 8 is a flowchart illustrating step S505 of FIG. 5 in detail.

FIG. 8 is a view illustrating a process of obtaining a plurality of selectable content items using a document obtained through a document object model according to an embodiment of the present disclosure.

FIG. 8 is a flowchart illustrating step S505 of FIG. 5 in detail.

The control unit 170 performs primary classification with respect to a plurality of nodes included in the document (S801).

The plurality of nodes (or the plurality of elements) may include an image node, an input node and the other node.

The image node (or the element) may be included in an image tag.

The control unit 170 may obtain an image node as a content item by passing the primary classification when an alt (alternative) attribute value is present in the image node.

That is, the control unit 170 may determine that an image tag is selectable when the alt attribute value is present.

When the alt attribute value of the image node is present, the control unit 170 may determine that a content item corresponding thereto has passed the primary classification.

The following shows an example of the alt attribute value of an <img> element (or node) included in the HTML document when the image tag is selectable (reference website—https://www.w3schools.com/tags/att_img_alt.asp).

<img src="smiley.gif" alt="Smiley face">

In the case of slingTV (registered trademark: America's premier Internet television service owned by Dish Network), text is applied to images for channels as alt attributes.

Figure 9A:
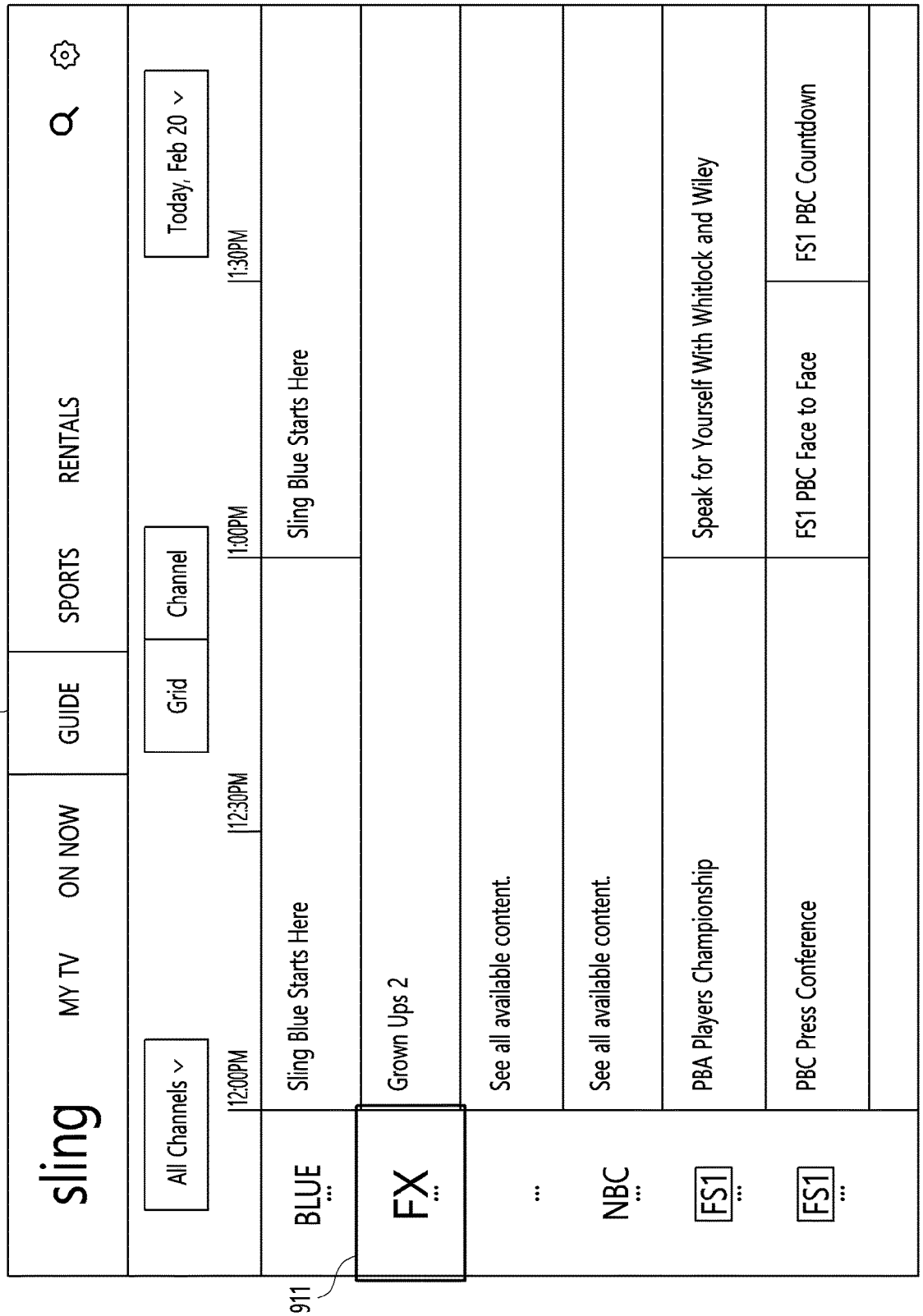
FIGS. 9a and 9b are views illustrating a service screen in which text is applied to images for channels provided by slingTV as alt attributes.
Figure 9B:
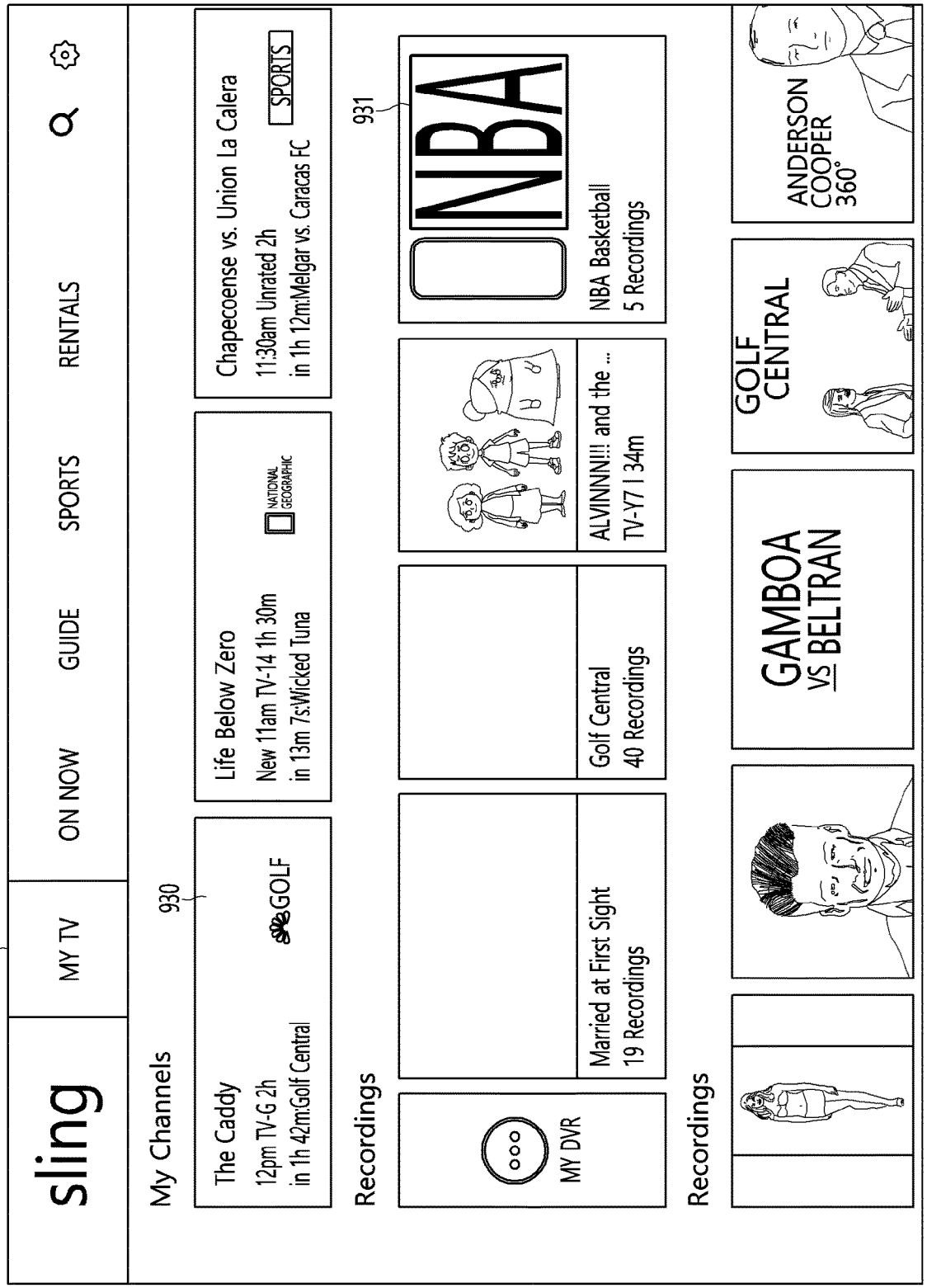

FIGS. 9a and 9b are views illustrating a service screen in which text is applied to images for channels provided by slingTV as an alt attributes.

Referring to FIG. 9a, a channel service screen 910 for providing channel information is shown. Referring to FIG. 9b, a personalization TV service screen 930 for a personalization service is shown.

Each of the channel service screen 910 and the personalization TV service screen 930 may be an execution screen of a web application.

The channel service screen 910 may include a plurality of channels.

A specific channel 911 of the plurality of channels may include text FX replacing an image.

That is, the specific channel 911 may include text <FX> instead of an image identifying the channel. This case is an example of applying text as an alt attribute.

The specific channel 911 may be classified as a selectable candidate content item.

The personalization TV service screen 930 may include a recording list, and the recording list may include a plurality of recording items.

A specific recording item 931 of the plurality of recording items may include text NBA replacing an image.

That is, the specific recording item 931 may include text <NBA> instead of an image identifying the recording item, and this case is an example of applying text as an alt attribute.

The specific recording item 931 may be classified as a selectable candidate content item.

FIG. 8 will be described again.

An input node (or element) may be primarily classified as a candidate content item when a placeholder attribute value is present.

This will be described with reference to FIG. 10.

Figure 10:
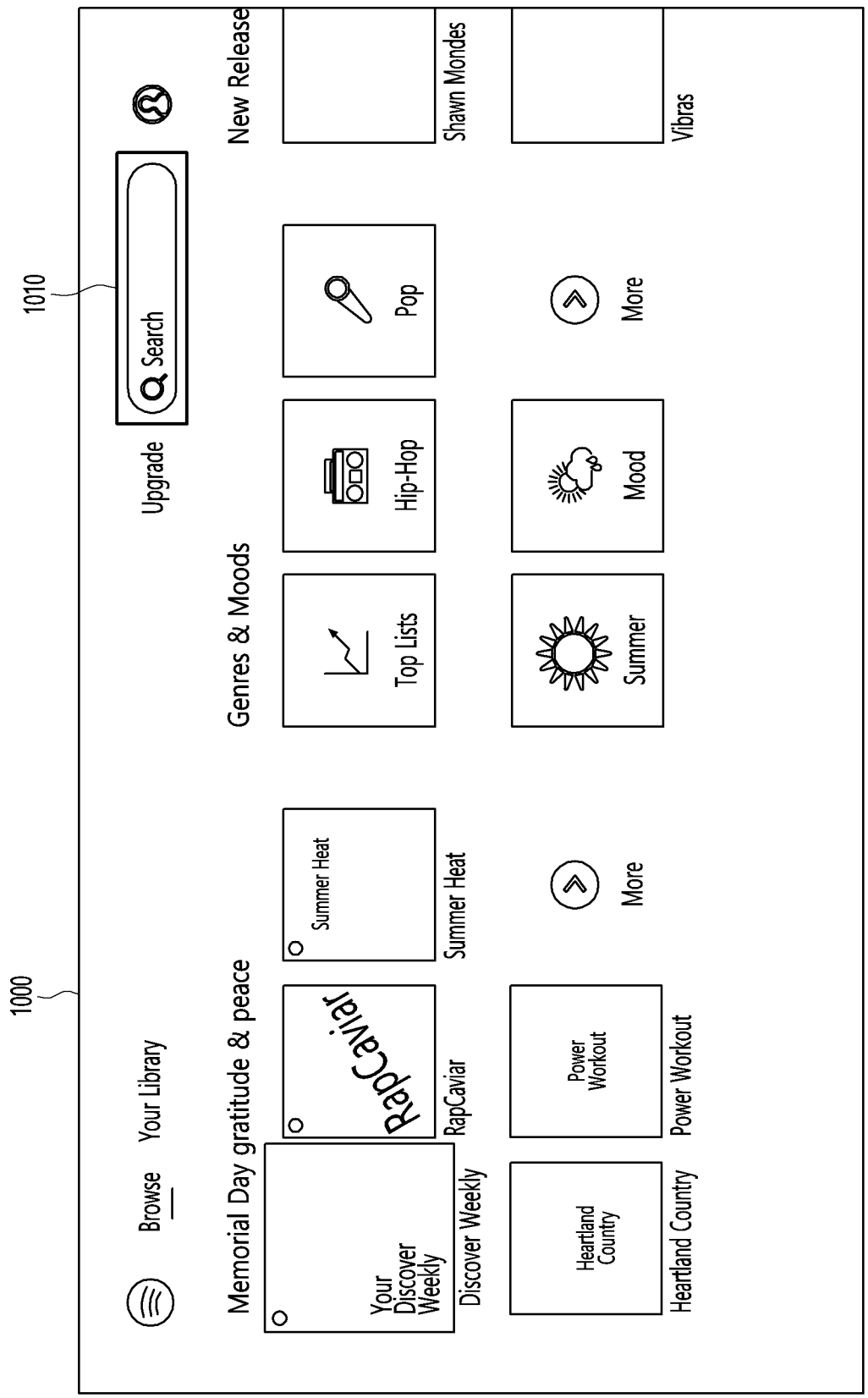
FIG. 10 is a view illustrating an example in which a placeholder attribute value is present on an input node through a web browser screen.

FIG. 10 is a view illustrating an example in which a placeholder attribute value is present on an input node through a web browser screen.

Referring to FIG. 10, a web browser screen 1000 is shown, and the web browser screen 100 may be an execution screen of a web application.

The web browser screen 1000 may include a search bar 1010 for content search.

The search bar 1010 includes text as a placeholder attribute <Search>.

The control unit 170 may primarily classify the search bar 1010 corresponding to the input node as a candidate content item, when the placeholder attribute value of the input node is present.

An example of the placeholder attribute value of an <input> node (or element) of the HTML document is as follows.

```
<form action="/action page.php">
    <input type="text" name="fname" placeholder="First name"><br>
    <input type="text" name="lname" placeholder="Last name"><br>
    <input type="submit" value="Submit">
</form>
```

FIG. 8 will be described again.

The other node may be a node in which a text value of a child Text node is present.

That is, the control unit 170 may select a content item corresponding to an upper node and a sub node as a candidate content item, when a text value is present in the sub node through the HTML document.

Specifically, the control unit 170 may search for child nodes of all nodes in the HTML document, and check a corresponding data value when the type of a child node is text.

That is, when the type of the child node is text, the control unit 170 may classify a content item corresponding to the child node and the upper node of the child node as a candidate content item.

The control unit 170 obtains a plurality of candidate content items which have passed primary classification (S803).

The control unit 170 determines whether each of the plurality of obtained candidate content items satisfies a secondary classification condition (S805).

The secondary classification condition may include a first classification condition and a second classification condition.

The first classification condition may be a condition in which each node is present in a window.

The window may represent a region corresponding to the area of the execution screen of the application.

The control unit 170 may obtain four vertex coordinates corresponding to each node using the document object model. Referring to FIG. 7, coordinate information 750 for any one element selected in the HTML document 700 is shown.

The control unit 170 may obtain four vertex coordinates corresponding to the node using coordinate information.

The control unit 170 may determine whether one or more of the four vertex coordinates is present in a window.

The control unit 170 may select a candidate content item corresponding to the node as a final content item, when one or more of the four vertex coordinates is present in the window.

The second classification condition may be a condition in which it is an uppermost node or a transparent node which has no text above the node.

The control unit 170 may check an uppermost node through an elementFromPoint method of a document interface with the position of a node. The elementFromPoint method may be an example of an application programming interface (API) of the document object model.

When the node is not an uppermost node and when a transparent node which has no text above the node or a node having only a border effect is present, the control unit 170 may select a candidate content item corresponding to the node as a final content item.

The node having only the border effect may be a node corresponding to a content item capable of being identified only by a highlight box.

The control unit 170 may find out a node array through the elementsFromPoint method of the document interface with the position of the node and check whether there is no text node having a data value with respect to nodes above the node.

When there is no text node having a data value with respect to nodes above the node, the control unit 170 may select a content item corresponding to the node as a final content item.

The control unit 170 obtains a candidate content item satisfying the secondary classification condition as a selectable content item (S807).

When there is a candidate content item which does not satisfy the secondary classification condition, the control unit 170 excludes the candidate content item from the final content item (S809).

That is, the control unit 170 may determine a candidate content item which does not satisfy the secondary classification condition as a non-selectable content item.

FIG. 5 will be described again.

Hereinafter, the control unit 170 receives a voice command uttered by a user (S507), and convert the received voice command into text (S509).

The voice command may be a command for selection of a content item instead of a wakeup word.

The control unit 170 may convert the voice command into text using a speech to text (STT) engine.

As another example, the step S507 of receiving the voice command of the user and the step S509 of converting the received voice command into text may be performed prior to step S501.

The control unit 170 determines whether a content item matching the converted text is present in a plurality of content items (S511).

The control unit 170 may determine whether a content item matching text is present in the plurality of content items obtained through the secondary classification process.

When the item matching the converted text is present in the plurality of content items, the control unit 170 selects the matching content item (S513).

The control unit 170 may obtain a content item corresponding to the matching text data value, by comparing a text data value included in a node corresponding to each of the plurality of content items with the converted text.

The control unit 170 may reproduce the content item as the matching content item is selected.

According to the embodiment of the present disclosure, the user can select desired content only by simple voice utterance, without direct click or selection operation.

Therefore, it is possible to provide improved user experience to the user.

Meanwhile, when there is no item matching the converted text in the plurality of content items, the control unit 170 outputs a notification indicating voice recognition failure (S515).

That is, the control unit 170 may output the notification indicating that there is no content item matching the voice command uttered by the user through the display unit 180 or the audio output unit 185.

Figure 11:
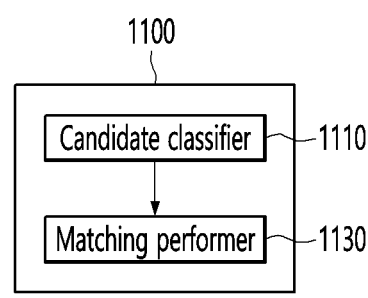
FIG. 11 is a view illustrating a configuration of an application manager according to an embodiment of the present disclosure.

FIG. 11 is a view illustrating a configuration of an application manager according to an embodiment of the present disclosure.

The application manager 1100 of FIG. 11 may be included in the control unit 170.

The application manager 1100 may include a candidate classifier 1110 and a matching performer 1130.

The candidate classifier 1110 may extract a plurality of candidate content items from the HTML document or the XML document obtained through the document object model.

The candidate classifier 1110 may extract a plurality of selectable content items from among the plurality of candidate content items through primary classification and secondary classification.

For primary classification and secondary classification, refer to the description of FIG. 8.

The matching performer 1130 may determine whether there is a content item matching the text of the voice command uttered by the user among the plurality of selectable or clickable content items.

When there is a content item matching the text of the voice command uttered by the user among the plurality of selectable or clickable content items, the matching performer 1130 may select or click the content item.

Figure 13:
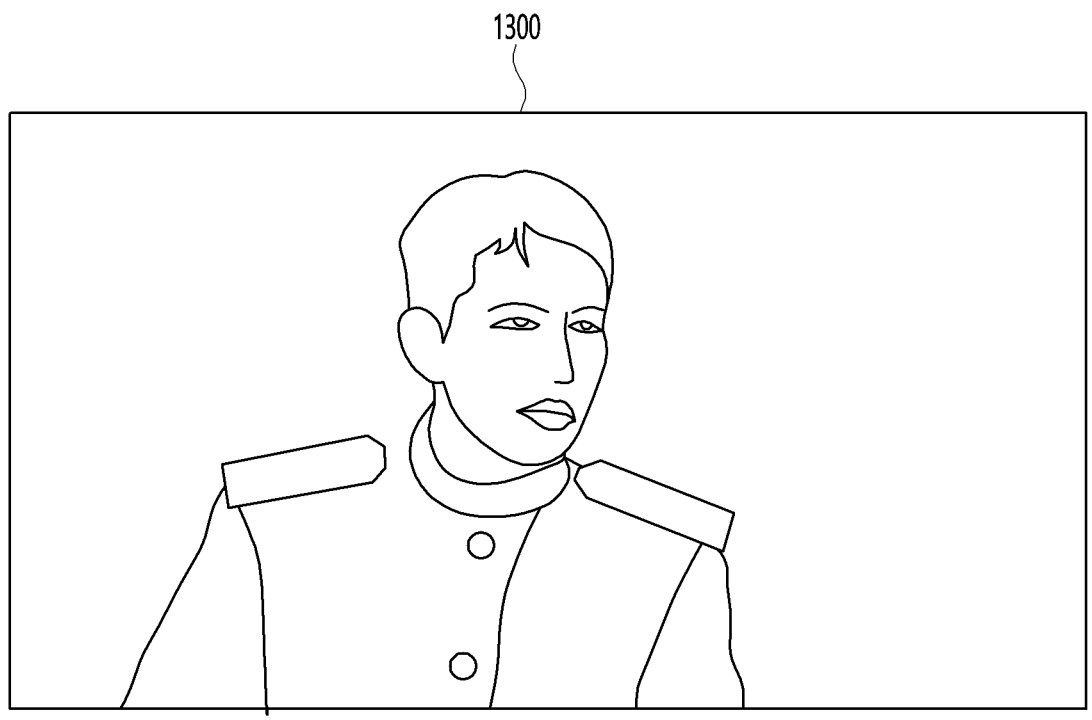

FIGS. 12 and 13 are views illustrating a user scenario according to an embodiment of the present disclosure.

Referring to FIG. 12, an execution screen 600 of a web application is shown.

A user may utter the name of a content item <steel rain>.

The display device 100 may convert the voice command uttered by the user into text and determine whether there is a content item matching the converted text among a plurality of selectable or clickable content items.

Upon determining that a specific content item 611 matches the converted text, the display device 100 may output the same result as selecting or clicking the content item 611.

For example, the display device 100 may reproduce a content image 1300 corresponding to the content item, as shown in FIG. 13.

As another example, the display device 100 may display detailed information of the content item 611 through the display unit 180.

Next, when there is a plurality of texts equal to the text of the voice uttered by a user on an execution screen of an application, a method of handling them will be described.

Figure 14:
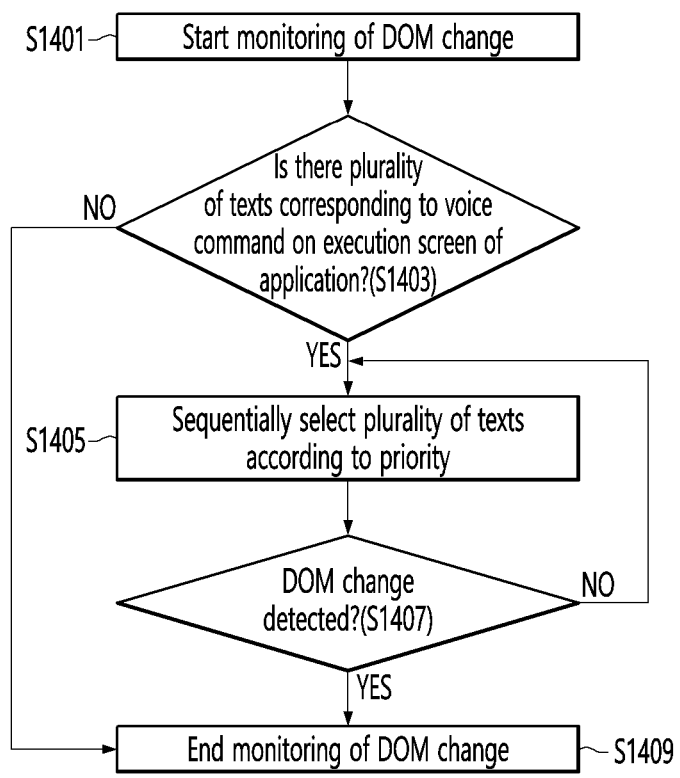
FIG. 14 is a flowchart illustrating a method of, when there is a plurality of texts equal to text of voice uttered by a user, handling them.

FIG. 14 is a flowchart illustrating a method of, when there is a plurality of texts equal to text of voice uttered by a user, handling them.

Figure 15:
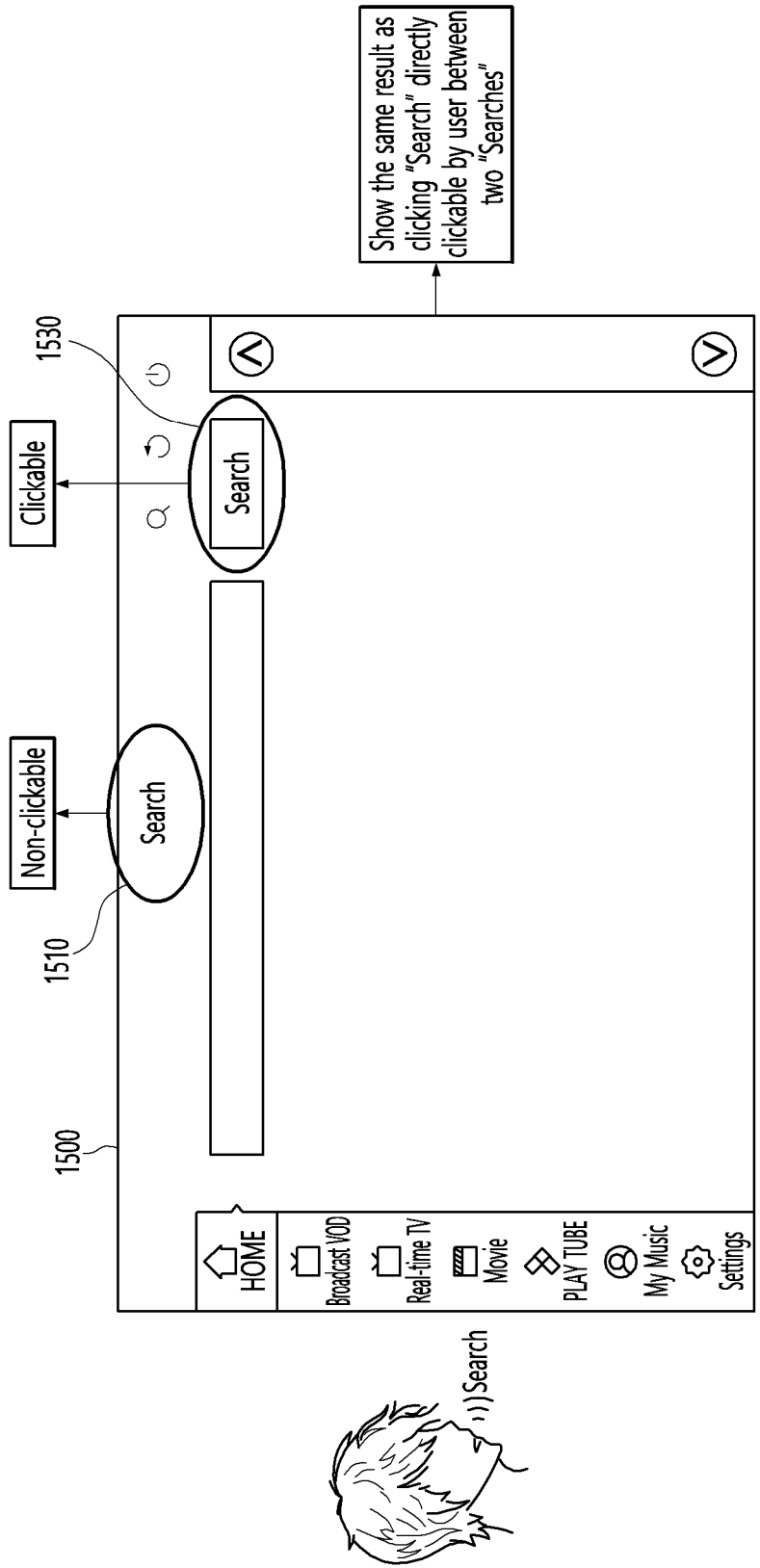
FIG. 15 is a view illustrating a user scenario in which, when overlapping texts are included in an execution screen of a web application, they are handled.

In particular, FIG. 14 illustrates an example in which, when an item which cannot be actually selected or clicked is included in a plurality of content items finally determined to be selectable or clickable in step S511 of FIG. 15, this is handled.

The content item which cannot be actually selected or clicked may be included in the selectable or clickable content items finally obtained in step S511 of FIG. 15.

The control unit 170 starts monitoring of document object model (hereinafter, DOM) change (S1401).

The control unit 170 starts monitoring of DOM change, by generating an observer using MutationObserver.

The control unit 170 may monitor DOM change, when the display device 100 provides a voice recognition service.

As another example, the control unit 170 may monitor DOM change, when receiving a voice command uttered by a user.

MutationObserver may be a generator for monitoring whether DOM change has occurred through a Web API.

For starting monitoring of DOM change by generating the observer using MutationObserver, refer to the description in the following website.

(https://developer.mozillaorg/en-US/docs/Web/API/MutationObserver/MutationObserver)

2) As options, the following values may be used.

Options={childList: true, attributes: true, subtree: true, characterData: true, attributeOldValue: true, characterDataOldValue: true}

The control unit 170 determines whether there is a plurality of texts corresponding to a voice command uttered by a user on an execution screen of an application (S1403).

The control unit 170 may determine whether there is a plurality of texts corresponding to the voice command uttered by the user, after starting monitoring of DOM change.

The control unit 170 may determine whether there is a plurality of content items matching the text corresponding to the voice command uttered by the user among a plurality of content items determined to be selectable or clickable.

The control unit 170 sequentially selects a plurality of overlapping texts according to priority (S1405), when there is a plurality of texts corresponding to the voice command uttered by the user.

Priority may be determined according to the respective positions of the plurality of overlapping texts on the execution screen of the application.

The control unit 170 may obtain the respective coordinates of the plurality of overlapping texts through the DOM.

The control unit 170 may sequentially select the overlapping texts from top to bottom, based on the obtained coordinates.

As another example, the control unit 170 may sequentially select the overlapping texts from the left to the right, based on the obtained coordinates.

The priority may be allocated based on arrangement of text having a highest probability of being selected first according to the point of view of the user.

The control unit 170 determines whether DOM change is detected according to selection of the overlapping text (S1407).

The control unit 170 may monitor whether DOM change occurs during a predetermined time, after at least one of the plurality of overlapping text is selected. The predetermined time may be 50 ms, but is only an example.

When DOM change is not detected, the control unit 170 returns to step S1405 and selects overlapping text with next priority.

When DOM change is not detected during a predetermined time after selecting the overlapping text, the control unit 170 may determine that selection or clicking of a node corresponding to the overlapping text is impossible.

When DOM change is detected, the control unit 170 determines that the overlapping text is selectable and ends monitoring of DOM change (S1409).

When DOM change is detected during the predetermined time after selecting the overlapping text, the control unit 170 may determine that selection or clicking is normally performed with respect to the node corresponding to the overlapping text.

FIG. 15 is a view illustrating a user scenario in which, when overlapping texts are included in an execution screen of a web application, they are handled.

Referring to FIG. 15, an execution screen 1500 of a web application is shown.

The execution screen 1500 of the web application may include two overlapping texts 1510 and 1530 including text <search>.

When a user utters a voice command <search>, the display device 100 may extract overlapping texts 1510 and 1530 matching <search> through an HTML document corresponding to the execution screen of the web application.

The display device 100 may obtain the respective coordinates the first overlapping text 1510 and the second overlapping text 1530 through the HTML document.

The display device 100 may determine priority of an object to be selected based on the coordinates of the first overlapping text 1510 and the coordinates of the second overlapping text 1530.

Since the first overlapping text 1510 is located above the second overlapping text 1530, the display device 100 may first select the first overlapping text 1510.

The display device 100 may determine whether DOM change occurs in a predetermined time after selecting the first overlapping text 1510.

When DOM change does not occur in the predetermined time after selecting the first overlapping text 1510, the display device 100 may finally determine that the first overlapping text 1510 is not selectable or clickable.

The display device 100 may select the second overlapping text 1530 with next priority. When DOM change occurs in the predetermined time after selecting the second overlapping text 1530, the display device 100 may output the same result as selecting or clicking the second overlapping text 1510.

That is, the display device 100 may perform searching with respect to a command input in a search window.

Next, FIG. 16 will be described.

FIG. 16 is a view illustrating another user scenario in which, when overlapping texts are included in an execution screen of a web application, they are handled.

Referring to FIG. 16, an execution screen 1600 of a web application is shown.

The execution screen of the web application may include two overlapping texts 1610 and 1630 including text <LOG IN>.

When a user utters a voice command <search>, the display device 100 may extract overlapping texts 1610 and 1630 matching <LOG IN> through an HTML document corresponding to the execution screen of the web application.

The display device 100 may obtain coordinates of a first overlapping text 1610 and a second overlapping text 1630 through the HTML document.

The display device 100 may determine priority of an object to be selected, based on the coordinates of the first overlapping text 1610 and the coordinates of the second overlapping text 1630.

Since the first overlapping text 1610 is located above the second overlapping text 1630, the display device 100 may first select the first overlapping text 1610.

The display device 100 may determine whether DOM change occurs in a predetermined time after selecting the first overlapping text 1610.

When DOM change does not occur in the predetermined time after selecting the first overlapping text 1610, the display device 100 may finally determine that the first overlapping text 1610 is not selectable or clickable.

The display device 100 may select the second overlapping text 1630 with next priority. When DOM change occurs in the predetermined time after selecting the second overlapping text 1630, the display device 100 may output the same result as selecting or clicking the second overlapping text 1610.

That is, the display device 100 may log in to the web application.

A title such as a menu or a category name and text in a subpage may be the same. In this case, the title may be non-clickable simple text and actually clickable text may be present on the subpage.

According to an embodiment of the present disclosure, when a title such as a menu or a category name and text in a corresponding subpage are the same, it is possible to rapidly distinguish selectable or clickable text and to properly perform operation according to a voice command of a user.

Figure 17:
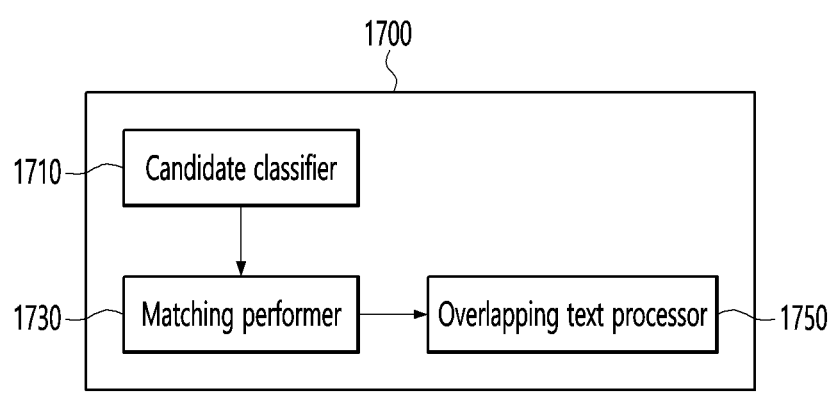
FIG. 17 is a view illustrating a configuration of an application manager according to an embodiment of the present disclosure.

FIG. 17 is a view illustrating a configuration of an application manager according to an embodiment of the present disclosure.

Referring to FIG. 17, the application manger 1700 may include a candidate classifier 1710, a matching performer 1730 and an overlapping text processor 1750.

The application manger 1700 may be included in the control unit 170.

The candidate classifier 1710 may extract a plurality of candidate content items from an HTML document or XML document obtained through a document object model.

The candidate classifier 1710 may extract a plurality of selectable content items from among a plurality of candidate content items through primary classification and secondary classification.

For primary classification and secondary classification, refer to the description of FIG. 8.

The matching performer 1730 may determine whether there is a content item matching text of a voice command uttered by a user among the plurality of content items determined to be selectable or clickable.

When there is a content item matching text of the voice command uttered by the user among the plurality of content items determined to be selectable or clickable, the matching performer 1730 may select or click the content item.

The overlapping text processor 1750 may extract a plurality of overlapping texts determined to be selectable or clickable.

The overlapping text processor 1750 may determine whether text corresponding to the voice command uttered by the user corresponds to overlapping text.

The overlapping text processor 1750 may determine whether there is a plurality of texts corresponding to the voice command uttered by the user on the execution screen of the application.

When there is a plurality of texts corresponding to the voice command uttered by the user, the overlapping text processor 1750 may sequentially select the plurality of overlapping texts according to priority.

The overlapping text processor 1750 may determine whether DOM change is detected according to selection of the overlapping text.

The overlapping text processor 1750 may select overlapping text with next priority, when DOM change is not detected.

The overlapping text processor 1750 may determine whether the overlapping text is selectable and end monitoring of DOM change, when DOM change is detected.

The overlapping text processor 1750 may transmit a signal indicating that DOM change is detected to the matching performer 1730.

The matching performer 1730 may select overlapping text causing DOM change.

According to the embodiment of the present disclosure, the above-described method may be implemented as processor-readable code on a processor-readable medium having a program recorded thereon. Examples of the processor-readable medium include a ROM, a RAM, a CD-ROM, a magnetic tape, a floppy disk, an optical data storage, and a carrier wave (e.g., data transmission over the Internet).

In the display device described above, the configuration and method of the above-described embodiments are not limitedly applicable, but all or some of the above-described embodiments are selectively combined so that various modifications can be made.

The invention claimed is:

1. A display device comprising:
a display configured to display an execution screen of an application; and
a processor configured to:
receive a voice command uttered by a user;
obtain a document corresponding to the execution screen using a document object model (DOM) as the voice command is received;
obtain a plurality of selectable content items from the obtained document, to determine whether there is a content item matching text of the voice command among the plurality of obtained content items; and
select the matching content item when there is a content item matching the text of the voice command as a result of determinations;
determine that among a plurality of overlapping texts, an overlapping text for which no change in the DOM is detected within a predetermined time cannot be selected, when there is the plurality of overlapping texts matching the text of the voice command; and
determine that among the plurality of overlapping texts, an overlapping text for which change in the DOM is detected within the predetermined time can be selected, when there is the plurality of overlapping texts matching the text of the voice command.

2. The display device of claim 1, wherein the processor is configured to:
obtain one or more image nodes, one or more input nodes and one or more text nodes among a plurality of nodes included in the document as a plurality of candidate content items, and
obtain the plurality of selectable content items among the plurality of candidate content items.

3. The display device of claim 2, wherein the processor is configured to:
when a replacement attribute value of an image node is present, classify the image node as a candidate content item,
when a placeholder attribute value of an input node is present, classify the input node as a candidate content item, and
when a text value of a child text node of a higher node is present, classify the higher node as a candidate content item.

4. The display device of claim 3, wherein the processor is configured to determine whether a classification condition is satisfied among the plurality of candidate content items, and
wherein the classification condition is a condition in which some of coordinates corresponding to each node are in a window indicating an area of the execution screen of the application and each node is a highest node or a transparent node which has no text above the node.

5. The display device of claim 1, wherein the document is an HTML document, and
wherein the document object model is an interface accessing the HTML document.

6. The display device of claim 1, wherein the processor is configured to output a notification indicating voice recognition failure when there is no item matching the text among the plurality of content items.

7. The display device of claim 1, wherein the processor is configured to sequentially select the plurality of overlapping texts according to priority and to finally select the overlapping text causing change in the document object model in the predetermined time according to selection.

8. The display device of claim 7, wherein the priority is determined according to a position of each of the plurality of overlapping texts.

9. The display device of claim 1, wherein the processor is configured to reproduce content of the content item according to selection of the content item.

10. A method of operating a display device, the method comprising:
    displaying an execution screen of an application;
    receiving a voice command uttered by a user;
    obtaining a document corresponding to the execution screen using a document object model (DOM) as the voice command is received;
    obtaining a plurality of selectable content items from the obtained document;
    determining whether there is a content item matching text of the voice command among the plurality of obtained content items;
    selecting the matching content item when there is a content item matching the text of the voice command as a result of determinations;
    determining that among a plurality of overlapping texts, an overlapping text for which no change in the DOM is detected within a predetermined time cannot be selected, when there is the plurality of overlapping texts matching the text of the voice command; and
    determining that among the plurality of overlapping texts, an overlapping text for which change in the DOM is detected within the predetermined time can be selected, when there is the plurality of overlapping texts matching the text of the voice command.

11. The method of claim 10, wherein the obtaining the plurality of selectable content items comprises:
    obtaining one or more image nodes, one or more input nodes and one or more text nodes among a plurality of nodes included in the document as a plurality of candidate content items, and
    obtaining the plurality of selectable content items among the plurality of candidate content items.

12. The method of claim 11, wherein the obtaining as the plurality of candidate content items comprises:
    when a replacement attribute value of an image node is present, classifying the image node as a candidate content item,
    when a placeholder attribute value of an input node is present, classifying the input node as a candidate content item, and
    when a text value of a child text node of a higher node is present, classifying the higher node as a candidate content item.

13. The method of claim 12, further comprising determining whether a classification condition is satisfied among the plurality of candidate content items, and
    wherein the classification condition is a condition in which some of coordinates corresponding to each node are in a window indicating an area of the execution screen of the application and each node is a highest node or a transparent node which has no text above the node.

14. The method of claim 10, wherein the document is an HTML document, and
    wherein the document object model is an interface accessing the HTML document.

* * * * *